US009569338B1

(12) United States Patent
Bradbury et al.

(10) Patent No.: US 9,569,338 B1
(45) Date of Patent: Feb. 14, 2017

(54) FINGERPRINT-INITIATED TRACE EXTRACTION

(71) Applicant: International Business Machines Corporation, Armonk, NY (US)

(72) Inventors: Jonathan D. Bradbury, Poughkeepsie, NY (US); Giles R. Frazier, Austin, TX (US); Michael Karl Gschwind, Chappaqua, NY (US); Christian Jacobi, Poughkeepsie, NY (US); Anthony Saporito, Highland, NY (US); Chung-Lung K. Shum, Wappingers Falls, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/956,824

(22) Filed: Dec. 2, 2015

(51) Int. Cl.
*G06F 11/00* (2006.01)
*G06F 11/36* (2006.01)
*G06F 11/30* (2006.01)

(52) U.S. Cl.
CPC ....... *G06F 11/3636* (2013.01); *G06F 11/3024* (2013.01); *G06F 11/3612* (2013.01)

(58) Field of Classification Search
CPC .............. G06F 11/3636; G06F 11/3612; G06F 11/3024
USPC .................. 714/42, 25, 27, 33, 34, 35, 38.1, 38.13, 714/45
See application file for complete search history.

(56) References Cited

U.S. PATENT DOCUMENTS

| | | | | |
|---|---|---|---|---|
| 5,996,092 | A * | 11/1999 | Augsburg | G06F 11/3466 712/227 |
| 6,622,300 | B1 * | 9/2003 | Krishnaswamy | G06F 9/45525 717/130 |
| 8,381,196 | B2 | 2/2013 | Warren et al. | |
| 8,401,835 | B2 * | 3/2013 | Agarwala | G06F 11/3636 703/24 |
| 2008/0215920 | A1 * | 9/2008 | Mayer | G06F 11/3648 714/38.1 |

(Continued)

OTHER PUBLICATIONS

W. Yoo, et al., "Automated Fingerprinting of Performance Pathologies Using Performance Monitoring Units (PMUs)," In Proc. of USENIX Workshop on Hot topics in parallelism, USENIX Association, 2011, pp. 1-6.

(Continued)

*Primary Examiner* — Joseph D Manoskey
(74) *Attorney, Agent, or Firm* — Cantor Colburn LLP; William A. Kinnaman, Jr.

(57) ABSTRACT

Techniques relate to fingerprint-initiated trace extraction. A determination is made of whether a fingerprint is present in software that is currently executing on a processor of a computer system. The fingerprint comprises a representation of a sequence of behavior that occurs in the processor while the software is executing. In response to determining that the fingerprint is not present in the software currently executing on the processor, monitoring continues for the software executing on the processor to determine whether the fingerprint is present. In response to determining that the fingerprint is present in the software executing on the processor, a trace is triggered of a code segment of the software corresponding to when the fingerprint is recognized. The trace is for a record of instructions of the code segment of the software.

20 Claims, 4 Drawing Sheets

(56) References Cited

U.S. PATENT DOCUMENTS

2014/0059334 A1    2/2014  Indukuru et al.
2014/0181594 A1*   6/2014  Sridharan ........... G06F 11/1004
                                                           714/45

OTHER PUBLICATIONS

IBM, Power ISA—Operating Environment Architecture-Server, Version 2.07 B, Book III-S, Chapter 9 Only, "Performance Monitor Facility," Apr. 9, 2015, pp. 983-1002.

* cited by examiner

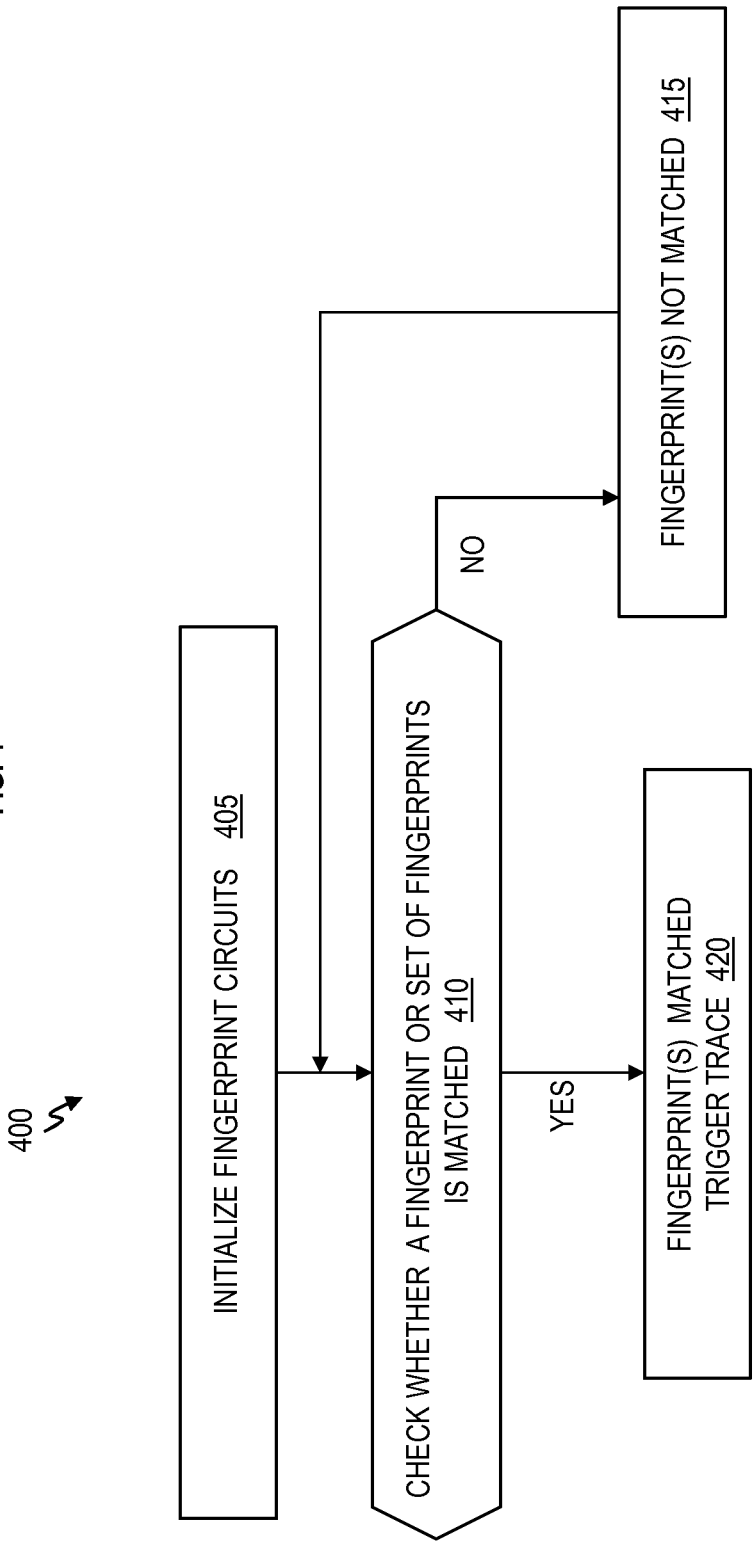

FINGERPRINT-INITIATED TRACE EXTRACTION

BACKGROUND

The present invention relates generally to computer processors, and more specifically, to fingerprint-initiated trace extraction.

A debugger or debugging tool is a computer program that is used to test and debug other programs (the "target" program). The code to be examined might alternatively be running on an instruction set simulator (ISS). This is a technique that has the ability to halt when specific conditions are encountered, but which will typically be somewhat slower than executing the code directly on the appropriate (or the same) processor. Some debuggers offer two modes of operation, full or partial simulation, to limit this impact.

SUMMARY

Embodiments include a method, system, and computer program product for fingerprint-initiated trace extraction. A determination is made whether a fingerprint is present in software that is currently executing on a processor of a computer system. The fingerprint comprises a representation of a sequence of behavior that occurs in the processor while the software is executing. In response to determining that the fingerprint is not present in the software currently executing on the processor, monitoring continues of the software executing on the processor to determine whether the fingerprint is present. In response to determining that the fingerprint is present in the software executing on the processor, a trace is triggered of a code segment of the software corresponding to when the fingerprint is recognized, where the trace is for a record of instructions of the code segment of the software.

BRIEF DESCRIPTION OF THE DRAWINGS

FIG. 4 depicts a flow chart of fingerprint-initiated trace extraction in accordance with an embodiment.

DETAILED DESCRIPTION

Figure 1:
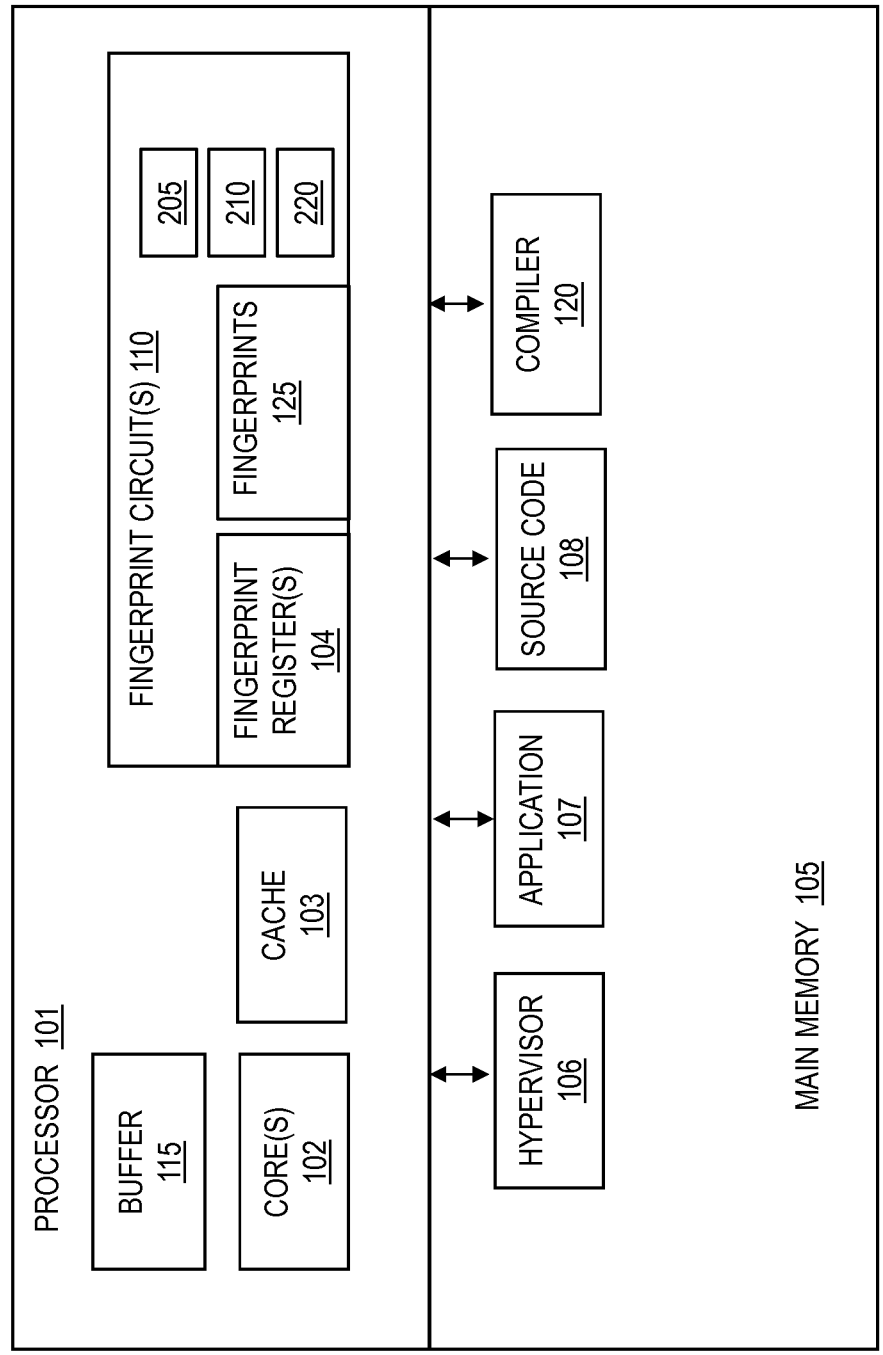
FIG. 1 depicts a computer system for implementing fingerprint-initiated trace extraction in accordance with an embodiment.

When analyzing software code of a program in order to resolve a functional or performance problem, it may be useful to obtain a "trace" of the code as the code executes. A trace is a particular instruction execution path through a program.

Given a trace for a particular program under a given set of conditions, that trace can be executed on debug tools to determine the cause of a problem. For example, when a trace is analyzed using debug tools, behaviors such as cache hit/miss sequences, branch misprediction rates, instruction discard patterns, pipeline stalls, instruction discards, etc., can be identified. Based on this analysis, changes can be made to the processor configuration and/or program in order to resolve the problem. The analysis may also indicate areas where the processor, itself, needs improvement.

In many situations, however, an overall performance problem may be caused by a specific section of code but it is uncertain where in the program this section of code appears. Thus, there is a need to extract a trace for either the entire program or a large part of it, and that trace first needs to be analyzed to determine where, within the entire program, the problem appears. This process can be time consuming. Also, in some situations the software code, itself, is proprietary, and it may (often) be impossible to obtain code of the entire software program in order to determine the most likely location of the problem.

Accordingly, embodiments provide the beneficial feature of being able to predetermine the segment of code that exhibits the problem without any need to analyze the entire source code (i.e., the entire software program) so that only a trace of that segment of code needs to be extracted and analyzed. Embodiments provide the means to extract the trace at the proper location (i.e., segment of code) in the software program by using a code fingerprint or fingerprint.

In the state-of-the-art, a problem with a program may be diagnosed using a performance monitor such as the performance monitor in a state-of-the-art processor. This performance monitor consists of counters that count configurable events such as cache hit rates, misprediction rates, fetch rates, completion rates, etc. Use of these counters to measure specific sections of code requires real-time software intervention in order to initialize them and periodically analyze their results. Also, since only rates of occurrence for the metrics analyzed are obtained, it may often be impossible to determine exactly what the cause of the problem is. This is especially true in a section of code in which the average occurrence of, for example, cache misses is high, but the high average is caused by a specific routine within that segment of code within which the average is obtained. As a result, in the state-of-the-art it is often necessary to either perform additional time-consuming analysis using a performance monitor, or extract and analyze a trace of the entire software program using specialized debug tools, and this significantly increases the time needed to identify the problem.

However, embodiments provide the technique and hardware for the processor to automatically recognize a code fingerprint. The fingerprint may be a specific code behavior known or assumed to be associated with a problem being analyzed. Such fingerprints include events such as specific sequences of data cache hits and misses, branch taken and branch not taken sequences, branch prediction hit and miss sequences, etc. Also, the fingerprint may be specific performance metrics including metrics such as average cache hit rates, average branch prediction hit rates, or other rates. More about code fingerprints is discussed below.

Now turning to the figures, FIG. 1 depicts a computer system 100 configured to implement fingerprint-initiated trace extraction in accordance with an embodiment. The computer system 100 includes a processor 101 in communication with a main memory 105. The processor 101 includes one or more cores 102 that execute instructions using cache memory 103. Computer programs, such as hypervisor 106, application 107, and source code 108, are stored in main memory 105 and executed by the processor 101. Any appropriate number of applications may be executed by a computer system such as computer system 100. The computer may also include source code 108 that may be complied by a compiler 120 for execution on the processor 101. The hypervisor 106, applications 107, source code 108, and/or any other program stored in main memory 105 may all be considered software programs, software, code, etc.

The processor 101 includes one or more fingerprint circuits 110 designed to monitor the execution of software programs (e.g., application 107, hypervisor 106, source code 108) on the processor 101. The fingerprint circuit 110 includes predefined/specified code fingerprints 125. The fingerprint circuit 110 is configured to automatically monitor the software program execution of, e.g., the application 107 in order to recognize the occurrence of a specified fingerprint 125, which indicates a potential problem. The fingerprint circuit 110 is configured to initiate a trace of the software program 107 (i.e., the segment of code) at the point when the specified fingerprint 125 is recognized. The trace (identified for the segment of code in the software program 107 having the potential problem) is utilized to analyze and correct the problem in the segment of code exhibiting the fingerprint 125.

Various counters 210 and modules 205 and 220 may be utilized to count incoming events and compare against a predefined number of events to determine when to initiate the trace. FIG. 1 may include a fingerprint recognition function in the fingerprint circuit 110 according to an embodiment for which fingerprints 125 consist of event rates. Examples of such event-rate fingerprints may include a data cache prefetch miss rate fingerprint 125, a branch miss rate fingerprint 125, and/or a branch target miss rate fingerprint 125. It is appreciated that other fingerprints may also be included in the hardware of the fingerprint circuits 110. As an example, the fingerprint threshold module 205 may be set to a specific value (e.g., the threshold may correspond to 10 data cache prefetch misses), and the fingerprint threshold module 205 may cause a reset to zero of the counter 210 and fingerprint threshold module 205 after a predefined number of occurrences of an event (e.g., 100 load instructions). When the number of events counted by the threshold event counter 210 (corresponding to the fingerprint) exceeds the threshold number of events (e.g., 10 data prefetch cache misses) specified in the fingerprint threshold module 205 (without exceeding the number of events per fingerprint set in the events per fingerprint module 220), the fingerprint circuit 110 determines that the software program (e.g., source code 108) is encountering a problem, and thus a trace is triggered via the fingerprint circuit 110. That trace can then be examined in detail to determine the cause of the problem.

The fingerprint circuit 110 may comprise one or more fingerprint shift registers 104 in some embodiments, and the fingerprint shift register 104 is used to determine the fingerprint 125 of the software code that is currently executing. Also, the fingerprint circuit 110 includes logic circuits to function as discussed herein. In one implementation, the fingerprint circuit 110 may also include firmware, microcode, etc., to execute the functions discussed herein.

In one implementation, the fingerprint circuit 110 may monitor execution of the software program 107 in order to determine a match to a single specified fingerprint 125. In response to finding the match, the fingerprint circuit 110 is configured to initiate the trace of the software program related to segment of code that (potentially) has the problem.

In another implementation, the fingerprint circuit 110 may monitor execution of the software program 107 in order to determine a match to a combination (set) of specified fingerprints 125, such as two or more different specified fingerprints 125. In response to finding the match to the combination of specified fingerprints 125 (e.g., two or more different specified fingerprints 125), the fingerprint circuit 110 is configured to initiate the trace of the software program related to segment of code that (potentially) has the problem.

For illustration purposes and not limitation, a few examples of code fingerprints 125 are discussed.

1) One code fingerprint 125 may be a data cache hit miss sequence. For example, the data cache hit and miss sequence may be [hit, hit, miss, miss, hit, miss, miss] for one code fingerprint 125. This same data cache hit and miss sequence may be represented by [1100100] in the fingerprint shift register 104, where '1' represents a hit and '0' represents a miss. In one implementation, the fingerprint register 104 may store the actual output of the software program 107 currently executing on the processor 101, such that the fingerprint circuit 110 can check the fingerprint shift register 104 and recognize when the output of the software program 107 in the fingerprint shift register 104 matches the data cache hit miss sequence of the fingerprint 125.

2) Another code fingerprint 125 may be a data cache hit miss sequence that is present when a given instruction is executed. The given instruction may have a predefined address (XYZ). As noted above for illustration purposes, the data cache hit miss sequence may be the sequence of cache hits and misses [hit, hit, miss, miss, hit, miss, miss] that occurred in load instructions leading up to the instruction at address XYZ. In this case, the fingerprint circuit 110 waits for execution of the given instruction of the software program 107 and only checks the fingerprint register 104 at the time when the given instruction (with address XYZ) executes. When the fingerprint register 104 contains the matching sequence when the given instruction at address XYZ, the trace is initiated.

3) A code fingerprint 125 may be branch prediction hit miss sequence for a specific set of branches identified by an instruction prefix. In such an embodiment, branch instructions have an operand that identifies whether or not they are to be used in the fingerprint. When a branch with an operand indicating that it is part of the fingerprint is executed, either a 1 or a 0 is shifted into a shift register, depending on whether the prediction was a correct prediction or misprediction.

4) Another code fingerprint 125 may be a branch history value when a given instruction is executed. In such an embodiment, the fingerprint consists of a sequence of 0's and 1's, where 0 means the branch was taken, and 1 means the branch was not taken. When a branch instruction is executed, either a 1 or a 0 is shifted into a shift register, depending on whether the branch was taken or not taken.

5) A code fingerprint 125 may be a call signature at a given instruction, where the call signature is a binary value that is a function of the sequence of call and return instructions that have previously been executed when an instruction is executed.

6) Another code fingerprint 125 may be the value of come from address register (CFAR) of the processor 101 at a given instruction, where the CFAR contains the address of the most-recently executed branch instruction that was taken.

7) There may also be code fingerprints 125 that are a set of average performance metrics. The set of average performance metrics may include metrics such as average data cache hit rate, average branch direction hit rate, average branch target hit rate, rate of taken branches, percent instructions of a certain type, etc.

In embodiments, it should be appreciated that the fingerprint circuit 110 provides the ability to specify a particular fingerprint 125, and to continuously monitor execution of a software program while checking if that fingerprint 125 is recognized. Upon recognition of the fingerprint 125, a trigger (by the fingerprint circuit 110) occurs that initiates a trace of the software program/code. The trace that is obtained may either be the instruction sequence leading up to the trigger, the sequence that is executed after the trigger, or a combination. In one implementation, the specified fingerprint 125 is chosen from a set of fingerprints 125 known to be characteristic of a particular problem, so that when the software program 107 under analysis exhibits the specified fingerprint 125, a trace can be extracted from the buffer 115 and analyzed. Since the trace is obtained only for the specific section (segment) of software code exhibiting the specified fingerprint 125, and since the fingerprint 125 is characteristic of a known problem, further analysis of the extracted trace determines the cause of the problem.

In accordance with embodiments, a trace is a sequence of instructions (i.e., a list of instructions) executed by the processor 101. This sequence of instructions may be accumulated in the buffer 115 on the processor 101 as the program executes. Since the buffer 115 is not infinite, the oldest instruction is deleted whenever a new instruction completes. In one embodiment, the sequence of instructions (the trace) executed by the processor 101 may be accumulated off the processor 101, such as in the main memory 105.

Embodiments provide various options for filling the buffer 115. The processor 101 has the option of filling the buffer continuously as the software program executes and/or not filling the buffer 115 until the fingerprint 125 is recognized. The fingerprint circuit 110 may be configured to instruct the processor 101 to choose the desired option of filling the buffer 115 based on the specified fingerprint 125 that is being searched for. In another implementation, the processor 101 may automatically choose the filling option. In one implementation, the desired option of filling the buffer 115 is set in advance by the user. More detail regarding the options of filling the buffer 115 are discussed below.

In one implementation, the processor 101 is configured to fill the buffer 115 continuously and stop when the fingerprint is recognized. In this case, the trace contains the instruction sequence leading up to recognition of the fingerprint 125.

In another implementation, the processor 101 is configured to fill the buffer 115 continuously and stop after a delay when the fingerprint 125 is recognized. In this case, the trace contains the instruction sequence leading up to the fingerprint 125 plus some additional instructions executed after the fingerprint 125.

In an implementation, the processor 101 does not start filling the buffer 115 until the point at which the fingerprint 125 is recognized. Once the fingerprint is recognized by the fingerprint circuit 110, the processor 101 continues filling the buffer 115 until the buffer 115 is full and then stops. In this case, the trace contains the instruction sequence after the fingerprint 125 was recognized.

It should be appreciated that the fingerprint 125 is utilized to identify the relevant trace, i.e., the relevant sequence of instructions, in the buffer 115 based on the point at which the fingerprint 125 is matched in the segment of code of the software. In some embodiments, the point at which the buffer stops filling after the fingerprint is recognized may be controlled by control register accessible to software.

After the buffer 115 stops filling in any of the above examples, a lightweight interrupt occurs (by the processor 101), and the lightweight interrupt application or a user can read the buffer 115. The instruction sequence (i.e., trace) that is read from the buffer 115 can be input (by the user) into simulators and other debug tools to analyze the execution of the software program around the matched fingerprint 125.

For example, the simulator might provide cache hit/miss data, branch misprediction rates, instruction discard patterns, pipeline stalls, etc. This information is then be used to correct the problem that was being investigated.

The benefit of this is that the fingerprint-recognition hardware (including the fingerprint circuits 110, fingerprint shift registers 104, and buffer 115 in the processor 101) is able to run all the time during normal execution and recognize when a problem (related to a given fingerprint 125) occurs. Only the trace data gathered around the time the problem occurred is extracted for analysis. Using the fingerprint 125 to identify the trace data gathered around the time the problem occurred is much more efficient than gathering a trace of the entire software program, and then attempting to discover where the problem actually occurred using the debug tools. For example, an entire software program may have thousands of instructions in sequence, but the fingerprint 125 may be utilized to determine that the problem occurred within about fifty instructions. It is much easier and less time consuming to analyze a trace of fifty instructions for a segment of code based on the matched fingerprint(s) 125, as compared to a trace of thousands of instructions for the entire software program without having the fingerprint 125.

Figure 2:
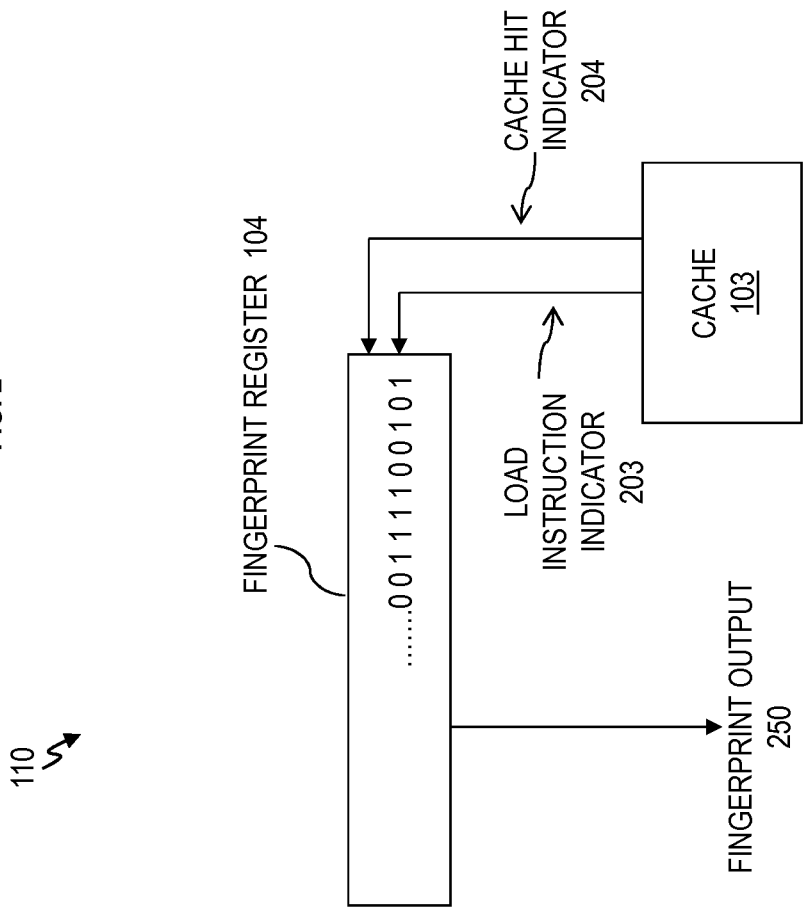
FIG. 2 depicts a fingerprint recognition function of a fingerprint circuit in accordance with an embodiment.

FIG. 2 depicts a fingerprint module of the fingerprint circuit 110 in accordance with an embodiment. Fingerprint module may comprise fingerprint register 104 in processor 101 of FIG. 1. Fingerprint module is a hardware module comprising a fingerprint register 104 that is a shift register. As shown in FIG. 2, fingerprint register 104 receives input from a cache 103 via load instruction indicator 203 and cache hit indicator 204. Whenever load instruction indicator 203 indicates a load instruction, a '1' is input into the shift register if the instruction results in a cache hit, and a '0' is loaded into the shift register when the instruction results in a cache miss (i.e., a load instruction with no cache hit). A fingerprint is output on fingerprint output 250; the fingerprint gives a snapshot of the cache hit/miss behavior of the current workload and may be used to identify the recent cache hit/miss behavior of load instructions in the workload. The fingerprint register 104 may be of any appropriate size, and the fingerprint that is output on fingerprint output 250 may be the entire contents of the fingerprint register 104 in some embodiments. FIG. 2 is shown for illustrative purposes only; a fingerprint module comprising a shift register may measure any aspect of processor performance in various embodiments.

Figure 3:
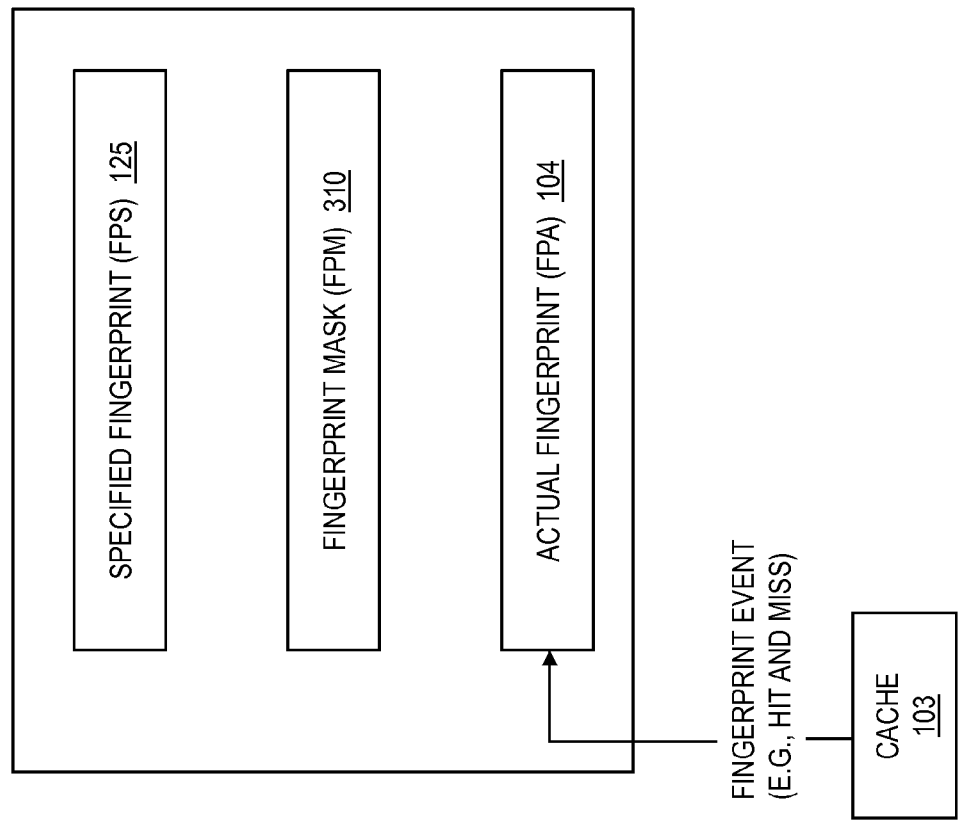
FIG. 3 depicts a fingerprint recognition function of the fingerprint circuit in accordance with an embodiment.

FIG. 3 depicts a fingerprint recognition function of the fingerprint circuit 110 according to an embodiment. In this embodiment, the fingerprint circuit 110 might detect an arbitrary sequence of taken/not taken branch instructions, branch instruction hit/miss sequences, data cache load hit/miss sequences, etc.

In FIG. 3, the fingerprint circuit 110 may include a specified fingerprint 125 that is being monitored for and an actual fingerprint (FPA) in the fingerprint shift register 104 that receives the output of the processor 101 (e.g., from the cache 103 in this example) for the software program (e.g., software application 107). The bits of the actual fingerprint in the actual fingerprint register 104 are compared against the specified fingerprint (FPS) 125 to find a match. When a match is found, the fingerprint circuit 110 initiates a trace, and when no match is found, the comparing continues. Optionally, a fingerprint mask register (FPM) 310 may be included, and the fingerprint mask register 310 is configured to turn off certain bits of the fingerprint register 104 during the comparison. For example, the fingerprint circuit 110 may compare every other bit of actual fingerprint in the fingerprint register 104 against the specified fingerprint 125 based on the mask of the fingerprint mask register 310.

An example scenario is provided for explanation purposes. In the fingerprint circuit 110, detection may be initiated with a function such as the DETECT function below.

In DETECT (FPS, FPM), the specified fingerprint 125 is the expected cache hit/miss sequence, where a 0 corresponds to a miss and a 1 corresponds to a cache hit.

The fingerprint mask register 310 is a bit-for-bit mask on the specified fingerprint register 125. The actual fingerprint being monitored (e.g., sequence of load hit misses or other sequence of events) is loaded into the actual fingerprint register 104 during execution of the software on the processor 101. A mask on the specified fingerprint is loaded into the fingerprint mask (FPM) register 310 in order to skip selected load instructions or shorten the specified fingerprint 125 to less than the register length.

As execution proceeds, the actual sequence of fingerprint events (load hits/misses, etc.) is shifted into the actual fingerprint register 104. Each bit of the actual fingerprint register 104 and specified finger print register 125 are continuously monitored over the fingerprint mask of the fingerprint mask register 310 (when utilized).

When the actual fingerprint in register 104 is equal to the expected fingerprint 125 over the mask, the expected fingerprint 125 has been recognized and a trace is triggered. The trace is then analyzed to identify the cause of the performance problem, and corrective actions are taken. Otherwise, execution continues and no trace is needed.

In an embodiment, the fingerprint circuit 110 may also continuously measure the hamming distance between the expected fingerprint 125 and the actual fingerprint 104, and recognize a match if the hamming distance between the two is greater than a specified threshold. This decreases the possibility of failing to trigger when a problem exists because of intermittent transient perturbations such as small interactions with other threads.

Various embodiments include multiple fingerprint recognition functions, or fingerprint modules. There may be a respective fingerprint recognition function for each type of fingerprint being detected. For example, a fingerprint detector that detects a specific sequence of load instruction data cache hits and misses may be implemented using a shift register that is referred to as a fingerprint register. Such a fingerprint register holds the sequence of the most-recent data cache hits and misses. A fingerprint register may be of arbitrary length in various embodiments, for example, 32 or 64 bits. The sequence of 1's and 0's in such a fingerprint register represent the most-recent history of load instruction data cache hits and misses, where a 0 indicates a data cache miss and a 1 indicates a data cache hit. Multiple shift registers may be included in the processor to provide other types of fingerprints, such as sequences of branches taken/not taken, sequences of branch prediction hit/misses, or sequences of data cache hit/misses for multiple cache levels. Further embodiments may generate a fingerprint that is based on a rate of occurrence of an event, such as the rate of load data cache misses over the previous 1000 load instructions, or the rate of branch prediction misses over the previous 1000 branch instructions. Further embodiments of a fingerprint may be generated based on the function of multiple different fingerprints, for example, in which an actual fingerprint consists of the presence of a set of different types of fingerprints, or the presence of a set of fingerprints when other fingerprints are not present. Further embodiments of a fingerprint may be equal to the current calling context of the program or equal to the current value of the CFAR. Any combination of different fingerprint types may be used in various embodiments.

FIG. 4 is a flow chart 400 of a computer implemented method for fingerprint-initiated trace extraction according to an embodiment.

At block 405, one or more fingerprint circuits 110 are initialized. There may be numerous fingerprint circuits 110 in the processor 101. In one implementation, a separate fingerprint circuit 110 may be utilized for each different fingerprint 125. In another implementation, each fingerprint circuit 110 may be configured to recognize multiple fingerprints 125.

At block 410, the fingerprint circuit 110 is configured to continuously monitor the output of the processor 101 to check for the fingerprint 125 and/or for a set of fingerprints. For example, two (or more) different fingerprints 125 may be simultaneously monitored for by the fingerprint circuit 110, and when the different fingerprints 125 are matched, a trace is started.

At block 415, when the fingerprint(s) 125 is not found in the output of the processor 101, the fingerprint circuit(s) 110 continues monitoring. For example, when value of the threshold event counter 210 does not meet the fingerprint threshold in the fingerprint threshold module 205 within the number of events per fingerprint set in the events per fingerprint module 220 (e.g., within 100 load instructions), the fingerprint circuit 110 continues monitoring. Also, when the value of the actual fingerprint register 104 does not match the value of the specified fingerprint 125, the fingerprint circuit 110 continues monitoring.

At block 420, when the fingerprint(s) 125 are matched in the output of the processor 101, the fingerprint circuit(s) 110 is configured to initiate/trigger a trace (in buffer 115) related to the code segment of software code that caused the problem (i.e., that caused the fingerprint 125 to occur). The match to the fingerprint 125 (and/or set of fingerprints) may be found when the value of the threshold event counter 210 reaches value of the fingerprint threshold module 205, as illustrated in FIG. 1. Additionally, the match to the fingerprint 125 (and/or set of fingerprints) may be found when the value of the actual fingerprint register 104 matches the specified fingerprint 125, as illustrated in FIG. 2.

Determining whether the fingerprint is present comprises tracking an event in the processor 101 by/via a fingerprint register 104 in order to determine that a fingerprint threshold in the fingerprint threshold 205 is met for a predefined number of occurrences of the event in events per fingerprint module 220.

In response to determining that the fingerprint threshold 205 is met for the predefined number of occurrences for the event in the events per fingerprint module 220, the fingerprint circuit 110 determines that the fingerprint 125 is present in the software executing on the processor 101 and triggers the trace of the code segment of the software.

Determining whether the fingerprint 125 is present comprises the fingerprint circuit 110 comparing the fingerprint 125 to an actual fingerprint register 104. In response to the fingerprint 125 matching a value in the actual fingerprint register 104, the fingerprint circuit 110 triggers the trace of the code segment of the software.

The fingerprint circuit 110 determines whether a set of fingerprints 125 are present in the software that is currently executing on the processor 101 of the computer system 100. In response to determining that the set of fingerprints 125 is present in the software executing on the processor 101, the fingerprint circuit 110 triggers the trace of the code segment of the software corresponding to when (i.e., the time) the set of fingerprints 125 is recognized.

The trace is for the record of the instructions filled in a buffer 115 corresponding to the code segment of the software. Filling the buffer 115 comprises at least one of filling the buffer 115 continuously as the software executes, not filling the buffer 115 until the fingerprint 125 is recognized, filling the buffer 115 continuously and stopping when the fingerprint 125 is recognized, and filling the buffer 115 continuously and stopping after a delay when the fingerprint is recognized.

Technical effects and benefits include improved performance in a computer processor. Technical effects and benefits include automatic monitoring the program execution in order to recognize the occurrence of a specified code fingerprint indicating a potential problem, the initiation of a trace of the software code when the specified fingerprint is recognized, and the use of the trace to analyze and correct a problem in the identified section of the software code exhibiting the fingerprint.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for fingerprint-initiated trace extraction, the method comprising:
    determining whether a fingerprint is present in software that is currently executing on a processor of a computer system, the fingerprint comprising a representation of a sequence of behavior that occurs in the processor while the software is executing, wherein the fingerprint is selected from the group consisting of a specific data cache hit and miss sequence in a predefined order of cache hits and misses, a specific branch taken and not taken sequence in a predefined order of branches taken and not taken, and a specific branch prediction hit and miss sequence in a predefined order of branch prediction hits and misses;
    in response to determining that the fingerprint is not present in the software currently executing on the processor, continuing to monitoring the software executing on the processor to determine whether the fingerprint is present; and
    in response to determining that the fingerprint is present in the software executing on the processor, triggering a trace of a code segment of the software corresponding to when the fingerprint is recognized, wherein the trace is for a record of instructions of the code segment of the software.

2. The method of claim 1, wherein determining whether the fingerprint is present comprises tracking an event in the processor by a fingerprint register in order to determine that a fingerprint threshold is met for a predefined number of occurrences of the event.

3. The method of claim 2, further comprising, in response to determining that the fingerprint threshold is met for the predefined number of occurrences for the event, determining that the fingerprint is present in the software executing on the processor and triggering the trace of the code segment of the software.

4. The method of claim 1, wherein determining whether the fingerprint is present comprises comparing the fingerprint to an actual fingerprint register; wherein in response to the fingerprint matching a value in the actual fingerprint register, triggering the trace of the code segment of the software.

5. The method of claim 1, further comprising determining whether a set of fingerprints are present in the software that is currently executing on the processor of the computer system.

6. The method of claim 5, further comprising in response to determining that the set of fingerprints is present in the software executing on the processor, triggering the trace of the code segment of the software corresponding to when the set of fingerprints is recognized.

7. The method of claim 1, wherein the trace is for the record of instructions filled in a buffer corresponding to the code segment of the software;
    wherein filling the buffer is selected from the group consisting of:
        filling the buffer continuously as the software executes;
        not filling the buffer until the fingerprint is recognized;
        filling the buffer continuously and stopping when the fingerprint is recognized; and
        filling the buffer continuously and stopping after a delay when the fingerprint is recognized.

8. A computer program product for implementing fingerprint-initiated trace extraction, the computer program product comprising:
    a computer readable storage medium having program instructions embodied therewith, the program instructions readable by a processing circuit to cause the processing circuit to perform a method comprising:
    determining whether a fingerprint is present in software that is currently executing on a processor of a computer system, the fingerprint comprising a representation of a sequence of behavior that occurs in the processor while the software is executing, wherein the fingerprint is selected from the group consisting of a specific data cache hit and miss sequence in a predefined order of cache hits and misses, a specific branch taken and not taken sequence in a predefined order of branches taken and not taken, and a specific branch prediction hit and miss sequence in a predefined order of branch prediction hits and misses;
    in response to determining that the fingerprint is not present in the software currently executing on the processor, continuing to monitoring the software executing on the processor to determine whether the fingerprint is present; and
    in response to determining that the fingerprint is present in the software executing on the processor, triggering a trace of a code segment of the software corresponding to when the fingerprint is recognized, wherein the trace is for a record of instructions of the code segment of the software.

9. The computer program product of claim 8, wherein determining whether the fingerprint is present comprises tracking an event in the processor by a fingerprint register in order to determine that a fingerprint threshold is met for a predefined number of occurrences of the event.

10. The computer program product of claim 9, further comprising in response to determining that the fingerprint threshold is met for the predefined number of occurrences for the event, determining that the fingerprint is present in the software executing on the processor and triggering the trace of the code segment of the software.

11. The computer program product of claim 8, wherein determining whether the fingerprint is present comprises comparing the fingerprint to an actual fingerprint register;

wherein in response to the fingerprint matching a value in the actual fingerprint register, triggering the trace of the code segment of the software.

12. The computer program product of claim 8, further comprising determining whether a set of fingerprints are present in the software that is currently executing on the processor of the computer system.

13. The computer program product of claim 12, further comprising in response to determining that the set of fingerprints is present in the software executing on the processor, triggering the trace of the code segment of the software corresponding to when the set of fingerprints is recognized.

14. The computer program product of claim 8, wherein the trace is for the record of instructions filled in a buffer corresponding to the code segment of the software;
    wherein filling the buffer is selected from the group consisting of:
        filling the buffer continuously as the software executes;
        not filling the buffer until the fingerprint is recognized;
        filling the buffer continuously and stopping when the fingerprint is recognized; and
        filling the buffer continuously and stopping after a delay when the fingerprint is recognized.

15. A computer system for fingerprint-initiated trace extraction, the system comprising:
    a memory; and
    a processor, communicatively coupled to the memory, the computer system configured to perform a method comprising:
    determining whether a fingerprint is present in software that is currently executing on the processor of the computer system, the fingerprint comprising a representation of a sequence of behavior that occurs in the processor while the software is executing, wherein the fingerprint is selected from the group consisting of a specific data cache hit and miss sequence in a predefined order of cache hits and misses, a specific branch taken and not taken sequence in a predefined order of branches taken and not taken, and a specific branch prediction hit and miss sequence in a predefined order of branch prediction hits and misses;
    in response to determining that the fingerprint is not present in the software currently executing on the processor, continuing to monitoring the software executing on the processor to determine whether the fingerprint is present; and
    in response to determining that the fingerprint is present in the software executing on the processor, triggering a trace of a code segment of the software corresponding to when the fingerprint is recognized, wherein the trace is for a record of instructions of the code segment of the software.

16. The computer system of claim 15, wherein determining whether the fingerprint is present comprises tracking an event in the processor by a fingerprint register in order to determine that a fingerprint threshold is met for a predefined number of occurrences of the event.

17. The computer system of claim 16, further comprising in response to determining that the fingerprint threshold is met for the predefined number of occurrences for the event, determining that the fingerprint is present in the software executing on the processor and triggering the trace of the code segment of the software.

18. The computer system of claim 15, wherein determining whether the fingerprint is present comprises comparing the fingerprint to an actual fingerprint register;
    wherein in response to the fingerprint matching a value in the actual fingerprint register, triggering the trace of the code segment of the software.

19. The computer system of claim 15, further comprising determining whether a set of fingerprints are present in the software that is currently executing on the processor of the computer system.

20. The computer system of claim 19, further comprising in response to determining that the set of fingerprints is present in the software executing on the processor, triggering the trace of the code segment of the software corresponding to when the set of fingerprints is recognized.

* * * * *